(12) United States Patent
Nakagawa et al.

(10) Patent No.: US 8,220,694 B2
(45) Date of Patent: *Jul. 17, 2012

(54) FRICTION STIR WELDING METHOD AND FRICTION STIR WELDED HOUSING

(75) Inventors: Koichi Nakagawa, Tokyo (JP); Qing Liu, Shenzhen (CN); Isao Shiozawa, Tokyo (JP); Takeo Nakagawa, Tokyo (JP)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW); FINE TECH Corporation, Higashi-Kojiya Ota-Ku, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/729,407

(22) Filed: Mar. 23, 2010

(65) Prior Publication Data

US 2011/0132969 A1    Jun. 9, 2011

(30) Foreign Application Priority Data

Dec. 3, 2009   (CN) .......................... 2009 1 0310832

(51) Int. Cl.
  *B23K 20/12* (2006.01)
(52) U.S. Cl. ...................... 228/112.1; 228/2.1
(58) Field of Classification Search ............... 228/112.1, 228/2.1
See application file for complete search history.

(56) References Cited

U.S. PATENT DOCUMENTS

| | | | | |
|---|---|---|---|---|
| 4,396,213 A * | 8/1983 | Hawkins | .................... | 285/289.3 |
| 5,725,682 A * | 3/1998 | Hashimoto | .................... | 148/220 |
| 6,045,028 A * | 4/2000 | Martin et al. | .................... | 228/112.1 |
| 6,450,394 B1 * | 9/2002 | Wollaston et al. | .................... | 228/112.1 |
| 6,543,670 B2 * | 4/2003 | Mahoney | .................... | 228/112.1 |
| 6,739,495 B2 * | 5/2004 | Okamura et al. | .................... | 228/112.1 |
| 6,783,055 B2 * | 8/2004 | Ezumi et al. | .................... | 228/112.1 |
| 7,090,112 B2 * | 8/2006 | Masingale | .................... | 228/112.1 |
| 7,360,677 B2 * | 4/2008 | Gendou et al. | .................... | 228/112.1 |
| 7,475,829 B2 * | 1/2009 | Hardt et al. | .................... | 239/1 |
| 7,882,998 B2 * | 2/2011 | Roos et al. | .................... | 228/112.1 |
| 8,052,033 B2 * | 11/2011 | Nakagawa et al. | .................... | 228/112.1 |

* cited by examiner

*Primary Examiner* — Roy King
*Assistant Examiner* — Michael Aboagye
(74) *Attorney, Agent, or Firm* — Altis Law Group, Inc.

(57) ABSTRACT

A friction stir welding method utilizes a joining tool comprising a friction surface; a first workpiece comprising a first treating layer, a second workpiece comprising a second treating layer, and a joining member with a melting point lower than that of the first workpiece and the second workpiece. The joining member is arranged at the joining portion of the first workpiece and the second workpiece, and abutting the first workpiece and the second workpiece. The friction surface of the joining tool is positioned to resist at least one of the first treating layer and the second treating layer. The joining tool is rotated and moved to agitate at least one of the first workpiece and the second workpiece, until at least part of the first workpiece and the second workpiece are plasticized and joined together.

10 Claims, 7 Drawing Sheets

FRICTION STIR WELDING METHOD AND FRICTION STIR WELDED HOUSING

BACKGROUND

1. Technical Field

The present disclosure generally relates to friction stir welding, and particularly, to a friction stir welding method using a joining tool with no mixing pin and a friction stir welded housing.

2. Description of Related Art

Friction stir welding is widely used to join aluminum alloy because it is simple to execute.

The surface of the stir-welded housing can be uneven because the material of the stir-welded portion of the housing flows during friction stir welding. After treatment, different aspects between the stir-welded and non-stir-welded portions of the housing may be visible, creating an unfavorable appearance. Despite annealing, the difference of the joined portion can persist.

Achievement of a favorable appearance in housings obtained by friction stir welding remains a challenge.

Therefore, an improved friction stir welding method is desired to overcome the described limitations.

BRIEF DESCRIPTION OF THE DRAWINGS

The components in the drawings are not necessarily drawn to scale, the emphasis instead being placed upon clearly illustrating the principles of the present disclosure. Moreover, in the drawings, like reference numerals designate corresponding parts throughout several views.

DETAILED DESCRIPTION

Figure 1:
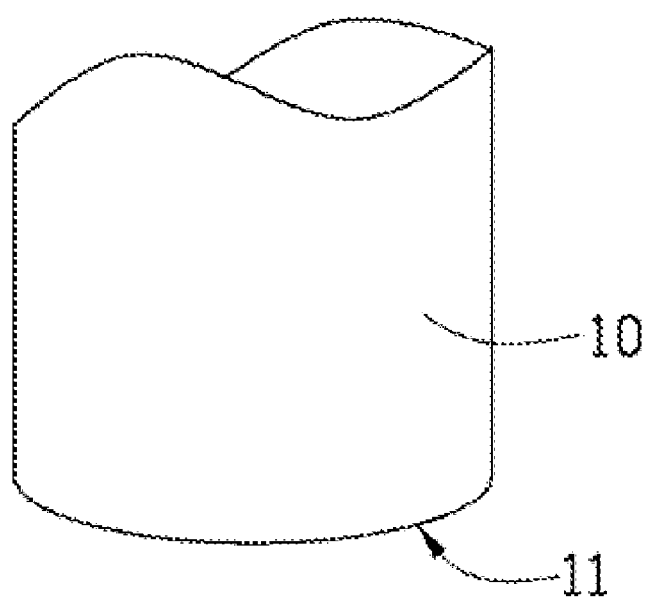
FIG. 1 is a schematic view of a joining tool used in a first embodiment of a friction stir welding method of the disclosure.
Figure 2:
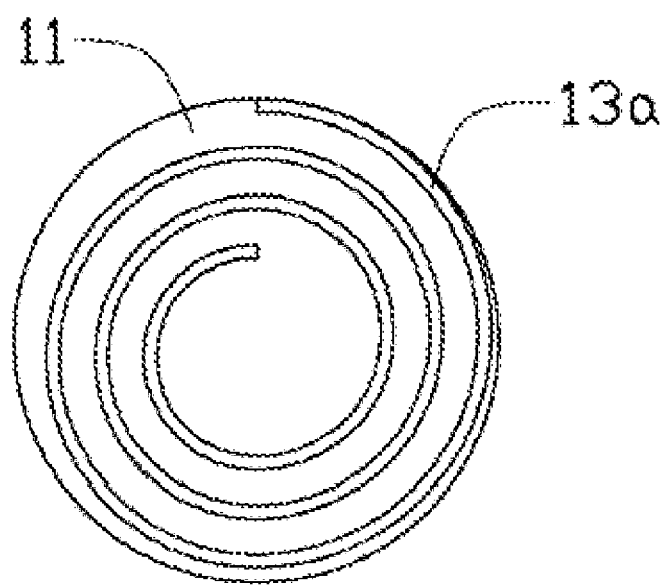
FIG. 2 is a bottom view of the joining tool of FIG. 1.
Figure 3:
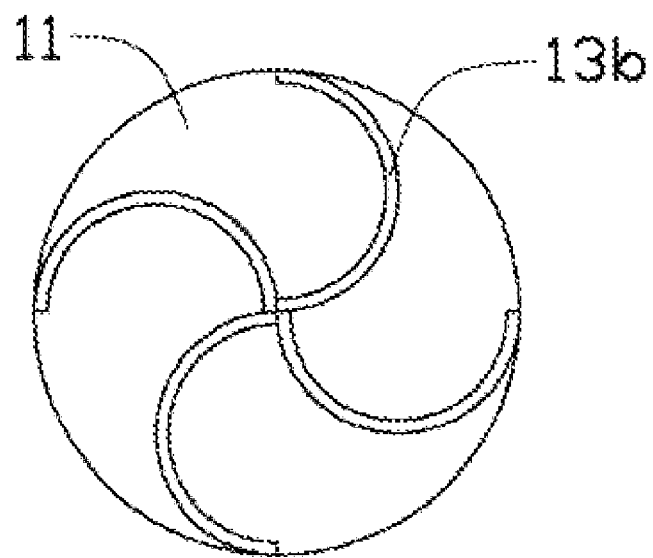
FIG. 3 is a bottom view of a joining tool of a second embodiment of a friction stir welding method.
Figure 4:
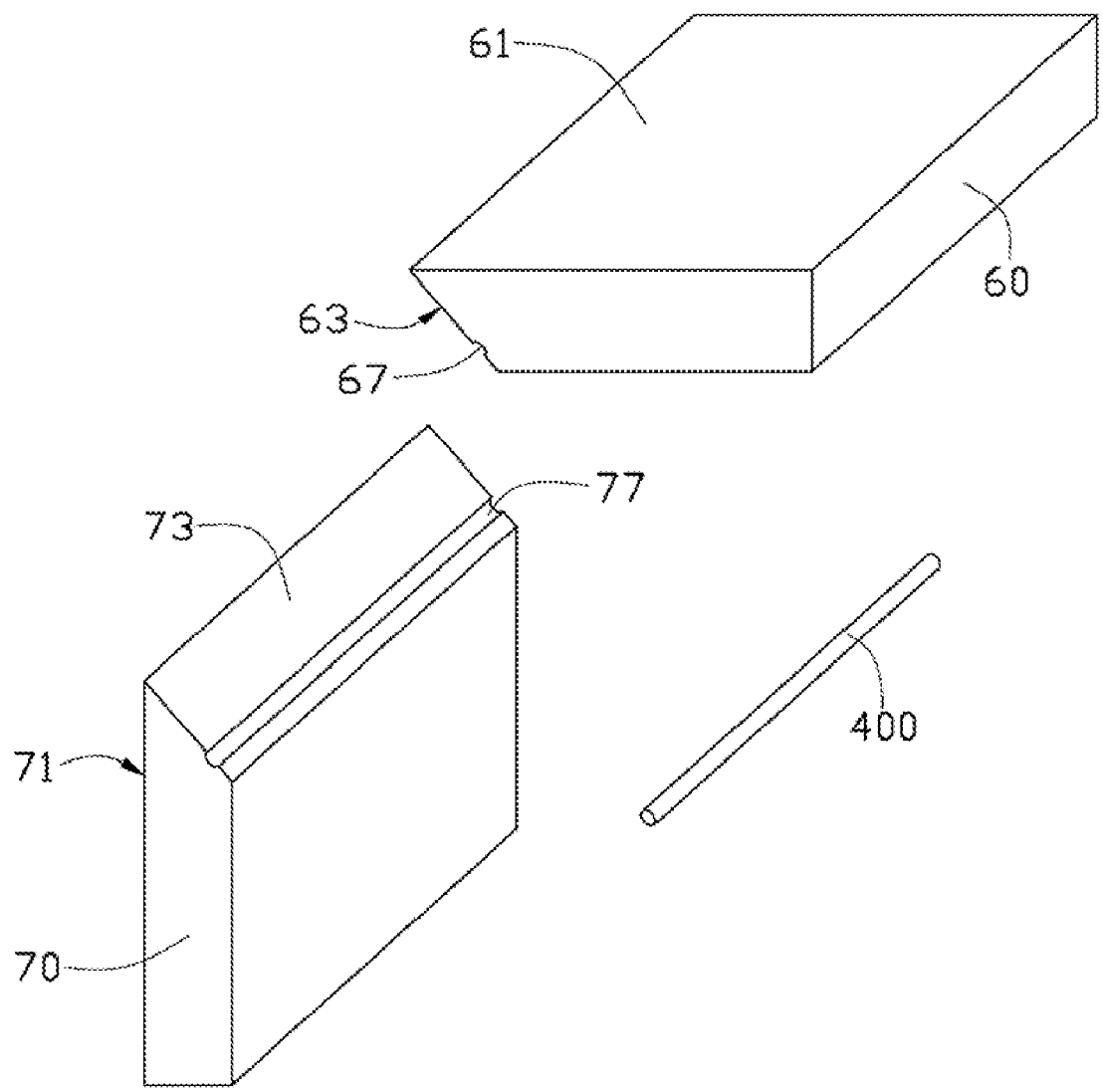
FIG. 4 is a schematic view of a first workpiece, a second workpiece and a joining member of the friction stir welding method of the disclosure.

Referring to FIGS. 1 and 4, a joining tool 10 is used to join a first workpiece 60 and a second workpiece 70 in a friction stir welding method as disclosed. The joining tool 10 is substantially cylindrical and includes a friction surface 11. The friction surface 11 is substantially flat. The joining tool 10 defines a slot in the friction surface 11. The slot may be spiral slot 13a as shown in FIG. 2, and may include a plurality of curved slots 13b originating at a rotation axis of the joining tool 10, as shown in FIG. 3.

Figure 5:
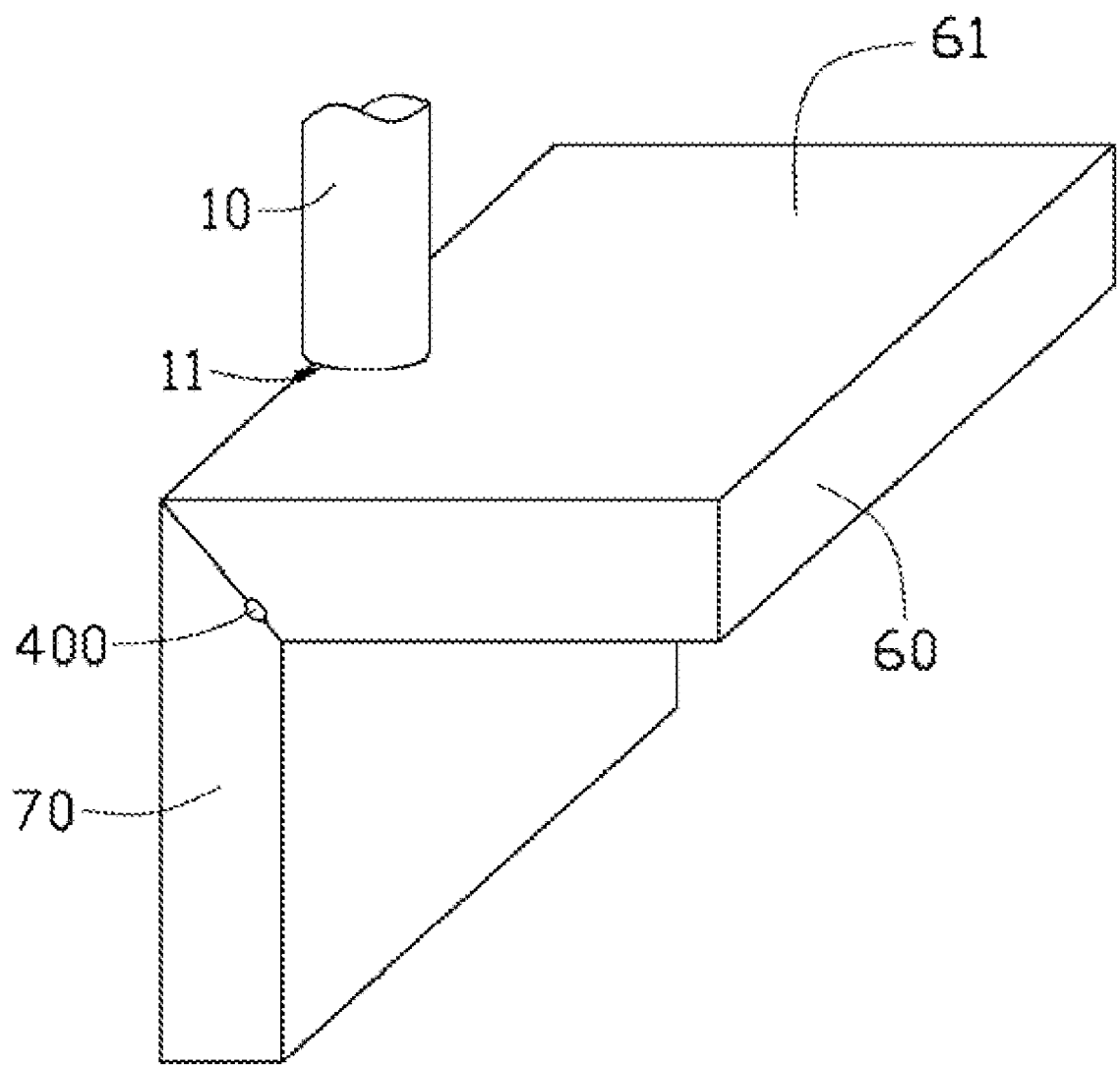
FIG. 5 is a schematic view showing the joining tool friction stirring the first workpiece and the second workpiece of FIG. 4.
Figure 6:
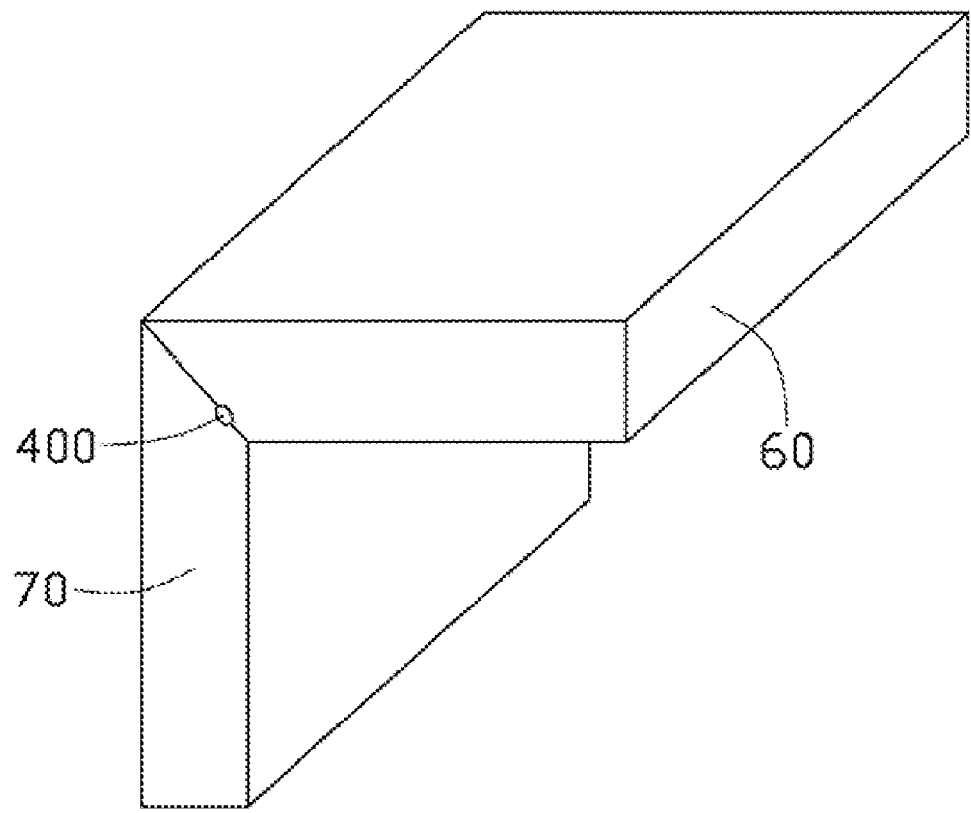
FIG. 6 is a schematic view of a welded housing joined by the friction stir welded method of the disclosure.
Figure 7:
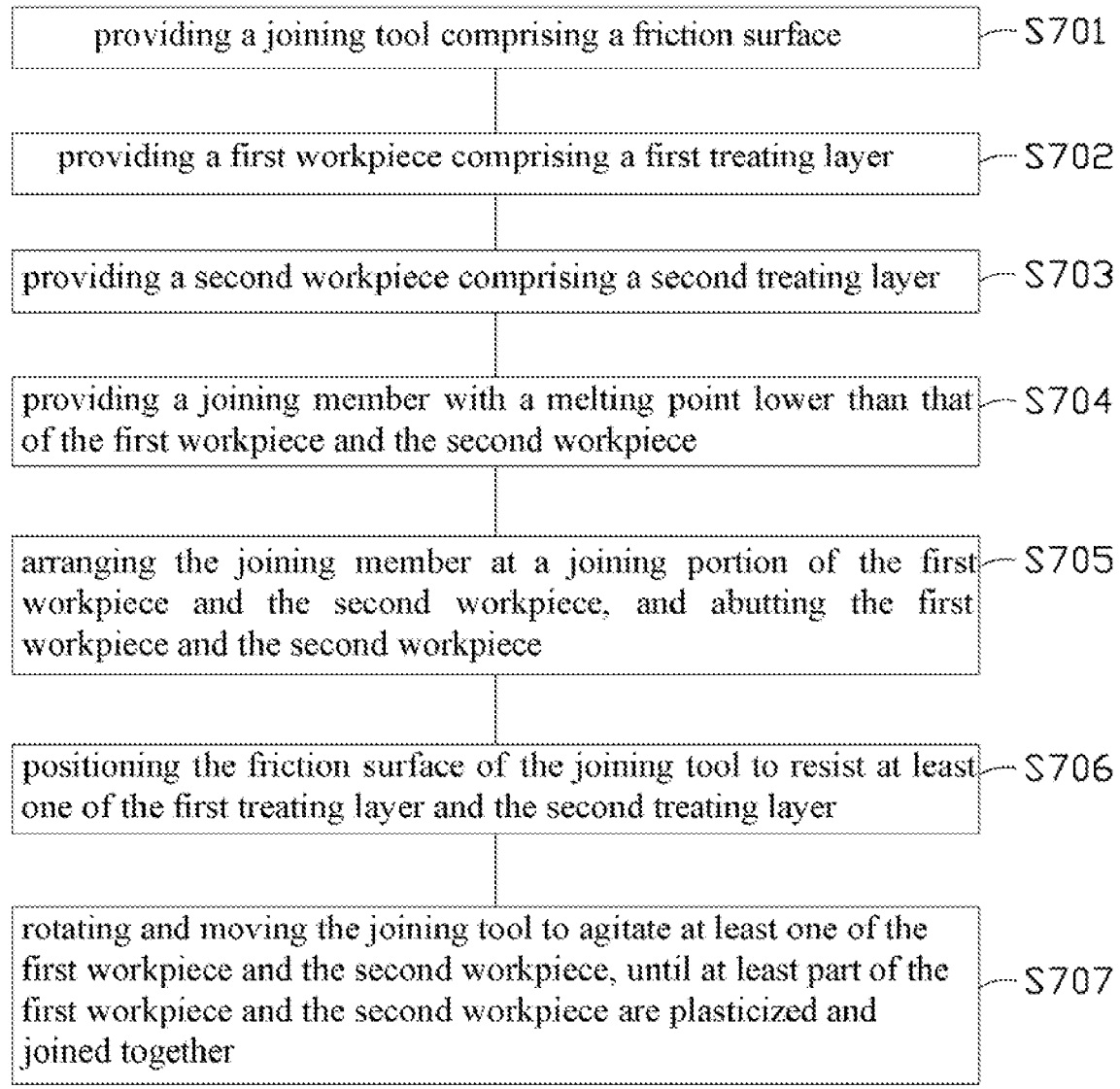
FIG. 7 is a flowchart of a friction stir welding method as disclosed.

Referring to FIGS. 1, 4 and 5, the first workpiece 60 includes a first treating layer 61 and a first joining surface 63 angled therewith. The first workpiece 60 further defines a first groove 67 from the first joining surface 63, at an end of the first workpiece 60 away from the first treating layer 61. The second workpiece 70 includes a second treating layer 71 and a second joining surface 73 angled therewith. The second workpiece 70 further defines a second groove 77 from the second joining surface 73. When the first workpiece 60 and the second workpiece 70 are arranged together, the first groove 67 and the second groove 77 cooperatively form a receiving slot (not labeled).

Before joining the first workpiece 60 and the second workpiece 70, a joining member 400 with a melting point lower than that of the first workpiece 60 and the second workpiece 70 is arranged in the receiving slot between the first workpiece 60 and the second workpiece 70. The first workpiece 60 and the second workpiece 70 are fixed abutting each other, wherein the first joining surface 63 contacts the second joining surface 73. An angle is defined by the first treating layer 61 of the first workpiece 60 and the second treating layer 71 of the second workpiece 70. The angle may be any degree other than 0° or 180°. In the illustrated embodiment, the angle is about 90°. The first joining surface 63 and the second joining surface 73 define a joint line (not labeled) therebetween, at an edge of the corner defined by the first workpiece 60 and the second workpiece 70.

Referring to FIGS. 1, and 4 through 7, the method of the friction stir welding method is described as follow. In step S701, a joining tool 10 comprising a friction surface 11 is provided. In step S702, a first workpiece 60 comprising a first treating layer 61 is provided. In step S703, a second workpiece 70 comprising a second treating layer 71 is provided. In step S704, a joining member 400 is provided, the joining member 400 has a melting point lower than that of the first workpiece 60 and the second workpiece 70. In step S705, the joining member 400 is arranged at a joining portion of the first workpiece 60 and the second workpiece 70, and the first workpiece 60 abuts the second workpiece 70. In step S706, the friction surface 11 of the joining tool 10 resists the first treating layer 61 of the first workpiece 60. In step S707, joining tool 10 rotates along the axis thereof relative to the first workpiece 60 and the second workpiece 70 and moves along the joint line. Thus, the joining tool 10 produces a local region of highly plasticized material such that the first workpiece 60 and the second workpiece 70 diffuse among each other. As such, the first workpiece 60 and the second workpiece 70 are joined to form a friction stir welded housing 300.

When heat created by the friction stir-welded first workpiece 60 is transmitted to the first groove 67 and the second groove 77, the material of the joining member 400, with a lower melting point, plasticizes before the first workpiece 60 and the second workpiece 70. Heat transmitted adjacent to the receiving slot need not raise the temperature adjacent thereto to that of the first workpiece 60 and the second workpiece 70, while raising the temperature to the melting point of the joining member 400. Thus, material of the joining member 400 flows in the receiving slot to join with and enhance the joining strength of the first workpiece 60 and the second workpiece 70.

Alternatively, the receiving slot may be only defined in the first workpiece 60 or the second workpiece 70. A joining member 400 may be positioned inbetween the first workpiece 60 and the second workpiece 70. The joining member 400 may be solder.

In the disclosed friction stir welding methods, only the joining portions of the workpieces need be machined, such that the joining tool 10 is small, with a correspondingly low driving force thereof required. Thus, equipment applying the joining tool 10 to friction stir welding is simple and low cost.

In the embodiment, after the first workpiece 60 is joined to the second workpiece 70, surface layers adjacent to the first treating layers 61 and the second treating layer 71 may be removed. That is, material with a changed metal structure is removed and material with unchanged metal structure is exposed. Therefore, the housing 300 formed by the above described friction stir welding method can provide a favorable appearance, even after subsequent treatment such as an anodic process.

In the joining method disclosed, a rotation direction of the joining tool 10 is the same as the extending direction from a center to a periphery of the joining tool 10. The joining tool 10 rotates at a high speed and moves at a low speed, and an end of the joining tool 10 extends slightly into the first workpiece 60 and the second workpiece 70. A rotation speed S, operating velocity V, and stir-welded depth H of the first workpiece 60 and the second workpiece 70 are determined by various factors, such as the material and thickness of the first workpiece 60 and the second workpiece 70, and the size and material of the joining tool 10, so long as the first workpiece 60 and the second workpiece 70 can be joined. In the illustrated embodiment, the first workpiece 60 and the second workpiece 70 are aluminum alloy plates, the rotation speed S is about 7000 rpm, the operating velocity V is about 500 mm/min, and the stir-welding depth H is about 0.15 mm.

The first workpiece 60 and the second workpiece 70 may be a material with low melting point, such as aluminum, aluminum alloy, copper alloy, or rubber, and be of any shape. A material of the joining tool 10 is a critical factor in selecting the material of the first workpiece 60 and the second workpiece 70. The increased melting point of the joining tool 10 allows a higher melting point of the material of the first workpiece 60 and the second workpiece 70. The melting point of the joining tool 10 must exceed those of the first workpiece 60 and the second workpiece 70. Joining portions of the workpieces may be a point, line or surface.

In the disclosed friction stir welding methods, only the joint of the workpieces need be machined, such that the joining tool 10 is small, with a correspondingly low driving force thereof required. Equipment applying the joining tool 10 to friction stir weld is simple and low cost.

The joining tool 10 may be applied in ordinary machining centers, whereby workpieces may be machined and joined at the same machining center. As such, the workpieces need only be clamped once, thus improving machining efficiency and precision. In addition, no special machinery is needed. Furthermore, the friction stir welding method can be used to join workpieces with complex joining surfaces together.

Finally, while various embodiments have been described and illustrated, the disclosure is not to be construed as being limited thereto. Various modifications can be made to the embodiments by those skilled in the art without departing from the true spirit and scope of the disclosure as defined by the appended claims.

What is claimed is:

1. A friction stir welding method, comprising:
   providing a joining tool comprising a friction surface;
   providing a first workpiece comprising a first treating layer, and a first joining surface slanted to the first treating layer;
   providing a second workpiece angled to the first workpiece, the second workpiece comprising a second treating layer, and a second joining surface slanted to the second treating layer;
   providing a joining member with a melting point lower than that of the first workpiece and the second workpiece;
   arranging the joining member at a joining portion of the first joining surface of the first workpiece and the second joining surface of the second workpiece, and abutting the first joining surface of the first workpiece and the second joining surface of the second workpiece, wherein the first workpiece defines a first groove from the first joining surface, and the second workpiece defines a second groove from the second joining surface, the first groove of the first workpiece and the second groove of the second workpiece cooperatively define a receiving slot receiving the joining member;
   positioning the friction surface of the joining tool to resist at least one of the first treating layer and the second treating layer; and
   rotating and moving the joining tool to agitate at least one of the first workpiece and the second workpiece, until at least part of the first workpiece and the second workpiece are plasticized and joined together.

2. The friction stir welding method of claim 1, wherein the friction surface of the joining tool resists the first treating layer of the first workpiece.

3. The friction stir welding method of claim 2, wherein the first workpiece is perpendicular to the second workpiece, and the friction surface of the joining tool resists the first treating layer of the first workpiece.

4. The friction stir welding method of claim 1, wherein the joining member is solder.

5. The friction stir welding method of claim 1, further comprising a step of removing a surface layer of the stir-welded first workpiece or second workpiece, after joining the first workpiece and the second workpiece.

6. The friction stir welding method of claim 5, wherein the removed material is material which has changed in structure from agitation.

7. The friction stir welding method of claim 5, wherein surface layers of both the first workpiece and the second workpiece are removed.

8. The friction stir welding method of claim 1, wherein the friction surface of the joining tool is substantially flat, and the joining tool defines a slot in the friction surface.

9. The friction stir welding method of claim 8, wherein the slot is spiral.

10. The friction stir welding method of claim 8, wherein the slot is curved slots originating at a rotation axis of the joining tool.

* * * * *